(12) United States Patent
Zhengdi et al.

(10) Patent No.: US 6,763,075 B2
(45) Date of Patent: Jul. 13, 2004

(54) SYMBOL ESTIMATION USING SOFT-OUTPUT ALGORITHM AND FEEDBACK

(75) Inventors: Qin Zhengdi, Oulu (FI); Mikko Jarvela, Oulu (FI)

(73) Assignee: Nokia Corporation, Espoo (FI)

( * ) Notice: Subject to any disclaimer, the term of this patent is extended or adjusted under 35 U.S.C. 154(b) by 478 days.

(21) Appl. No.: 09/748,220

(22) Filed: Dec. 27, 2000

(65) Prior Publication Data

US 2001/0022820 A1 Sep. 20, 2001

Related U.S. Application Data

(63) Continuation of application No. PCT/EP98/05481, filed on Aug. 21, 1998.

(30) Foreign Application Priority Data

Jun. 29, 1998 (EP) .................. PCT/EP98/04040

(51) Int. Cl.[7] .................. H04L 27/06; H03D 1/00
(52) U.S. Cl. .................. 375/341; 708/780; 708/794
(58) Field of Search .................. 375/229–234, 375/285, 262, 265, 346, 350, 341, 224, 227; 714/780, 792, 794

(56) References Cited

U.S. PATENT DOCUMENTS 6,269,124 B1 * 7/2001 Nagayasu et al. .......... 375/262

6,302,576 B1 * 10/2001 Ono et al. .................. 714/794

FOREIGN PATENT DOCUMENTS

EP  0843444 A2  5/1998

OTHER PUBLICATIONS

Kurt Metzger; "A new Approach to Sequential Detection", European Transactions on Telecommunications and Related Technologies, vol. 5, No. 2, Mar. 1, 1994, pp. 235–244.

Jianjun Wu and A. Hamid Aghvami; "A new Adaptive Equalizer with Channel Estimator for Mobile Radio Communications", IEEE Transactions On Vehicular Technology, vol. 45, No. 3, Aug. 1996, pp. 467–474.

International Search Report for PCT/EP98/05481.

International Search Report for PCT/EP98/04040.

* cited by examiner

Primary Examiner—Jean B. Corrielus
(74) Attorney, Agent, or Firm—Squire, Sanders & Dempsey L.L.P.

(57) ABSTRACT

In a mobile communication system, a method and circuit for symbol estimation is described. According to the method, a soft output decision for a symbol is estimated and is fed back to modify decisions made for a subsequent set of received samples. This has the advantage of conveying not only information about the most likely symbol, but also information about the noise environment.

11 Claims, 3 Drawing Sheets and/or transmitting circuitry within a mobile station or a base station of a mobile communication system.

SYMBOL ESTIMATION USING SOFT-OUTPUT ALGORITHM AND FEEDBACK

This application is a continuation of international application serial number PCT/EP98/05481, filed Aug. 21, 1998.

FIELD OF THE INVENTION

The present invention relates to symbol estimation in a mobile communication system.

BACKGROUND

In high data rate mobile communication, system performance is degraded heavily by intersymbol interference ISI. The equalisation technique is one of the main issues for a receiver to combat ISI. It is well established that maximum likelihood sequence estimation MLSE, implemented by the Viterbi algorithm can provide optimum performance in terms of sequential error event probability. This technique however has great computational complexity which hinders it from use for channels with a long delay spread. In particular, when the technique is implemented using a trellis structure, the complexity of the trellis structure increases exponentially with channel length. Channel length is a time period which is defined as the influence depth (time duration) of each symbol. With a symbol transmitted at time $t_0$, the symbol will be heard most significantly between times $t_1$ to $t_2$ (subsequent to $t_0$). The channel length is considered to be $t_2-t_1$.

It is an aim of the present invention to reduce the complexity of symbol estimation, particularly but not exclusively for implementing symbol estimation in channels with a long delay spread using a trellis structure.

SUMMARY OF THE INVENTION

According to one aspect of the present invention there is provided a method of estimating symbols transmitted between a mobile station and a base station in a communication system comprising:

receiving via a communication channel a set of received signal samples which have travelled via different transmission paths, each signal sample conveying a symbol component;

estimating from the set of received signal samples a soft-output decision for the symbol which combines over a number of symbol components an estimated value for each symbol component with a likelihood parameter which indicates a level of reliability associated with that estimated value; and using the soft-output decision as a feedback element to modify a subsequent set of received signal samples prior to estimating a soft output decision for the subsequent set of received samples.

According to another aspect of the present invention there is provided a symbol estimation circuit for use in a mobile communication system for estimating symbols, the circuit comprising:

a receiver arranged to receive via a communication channel a set of signal samples which have travelled via different transmission paths, each signal sample conveying a symbol component;

a estimator for estimating from the set of received signal samples a soft-output decision for the symbol which combines over a number of symbol components an estimated value for each symbol component with a likelihood parameter which indicates a level of reliability associated with that estimated value; and a feedback path for feeding back the soft-output decision to modify a subsequent set of received signal samples prior to estimating a soft-output decision for the subsequent set of received samples.

The symbol estimation technique can be used recursively either within signal bursts or between signal bursts. That is, in a communication system wherein a sequence of signal bursts are received by the communication channel, a soft-output decision for each symbol in the signal burst may be estimated and used as a feedback element prior to estimation of a subsequent symbol in the same signal burst. Alternatively, a soft-output decision for a preceding signal burst can be used for a subsequent signal burst. The former is more likely to be reliable.

Estimation of the soft-output decision for the symbol can be carried out in a trellis equaliser in which state transitions are effected via a set of transition branches. The states for the trellis equaliser can initially be defined by channel taps of a channel impulse response estimated from the receive signal samples.

In the described embodiment, a first set of the channel taps is utilised for setting the initial states in a trellis equaliser and a second set of the channel taps are treated as interference and used to modify the input signal prior to estimating a subsequent soft-output decision.

A minimum phase channel impulse response can be generated using an all path prefilter.

In the technique according to the following described embodiments of the invention, a suboptimum soft-output algorithm SSA is used as a feedback decision as a tradeoff between optimality and implementation reality. The algorithm can be implemented using a trellis structure. The computational power needed for the described suboptimum soft-output algorithm is in the same range as that of using a Viterbi algorithm, but the memory needed is much less. Moreover, the algorithm generates a soft-output decision rather than a hard decision and the inventors have noted that soft decision feedback can give better performance than hard decision feedback for a low signal to noise ratio domain.

For a better understanding of the present invention and to show how the same may be carried into effect reference will now be made by way of example to the accompanying drawings.

DESCRIPTION OF THE PREFERRED EMBODIMENT

Figure 1:
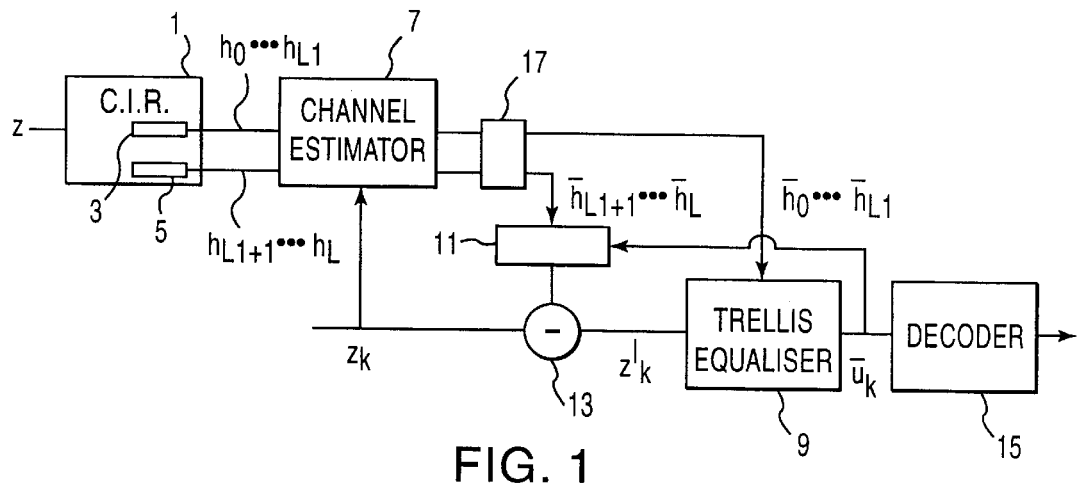
FIG. 1 is a block diagram illustrating schematically symbol estimation in accordance with one embodiment of the invention.

FIG. 1 denotes schematically the principles of the invention. The components of FIG. 1 may form part of receiving circuitry either within a mobile phone or within a base station. An incoming signal z is supplied to a channel impulse response block 1 which generates a channel impulse response in the form of a plurality of channel taps $h_0 \ldots h_L$ in a manner which is known and which will not be described further herein. For the purposes of the present embodiment, the channel impulse response can be considered to be held in two stores which are denoted 3 and 5. Of course, these could form part of a common memory. The first store 3 holds a first part of the channel impulse response in the form of channel taps $h_0 \ldots h_{L1}$ and the second store 5 holds a second part of the channel impulse response in the form of channel taps $h_{L1+1} \ldots h_L$. The channel taps are supplied to a channel estimator which estimates for each received signal sample $z_K$ a first set of estimated channel taps $h_0 \ldots h_{L1}$ and a second set of estimated channel taps $h_{L1+1} \ldots h_L$. It will be appreciated that the channel impulse response taps themselves are generated using a sequence of received signal samples over a period of time, for example the training sequence. The channel estimator generates estimated channel taps appropriate for the received signal sample $z_k$ at time k.

The first set of estimated channel taps $h_0 \ldots h_{L1}$ are supplied to a trellis equaliser 9 which has $M^{L1}$ states defined by the estimated channel taps. The operation of the trellis equaliser is described in more detail in the following. The second part of the estimated channel taps $h_{L1+1} \ldots h_L$ are supplied to an interference remover ilithe function of which will shortly be described.

The trellis equaliser 9 generates an estimate for the transmitted signal element $U_k$ corresponding to the received signal sample $z_k$. This is referred to herein as a soft-output decision. Within the trellis equaliser this has been done by combining a number M of symbol components A together with a likelihood for each component to generate an estimate $a_k$ of the transmitted symbol. This is described in more detail in the following.

The soft-output decision for the transmitted signal element $u_k$ is fed back to the input of the trellis equaliser 9 to modify subsequent decisions generated by the trellis equaliser. In the circuitry illustrated in FIG. 1, "interference" based on the second part of the estimated channel taps is first removed by the interference remover 11. Then, at the subtracter 13 an interfering signal based on a calculation utilising the soft-output decision and the estimated channel taps of the second part are subtracted from subsequent incoming samples $z_k$. The interference remover 11 performs the following function:

$$\sum_{j=L1+1}^{L} u_{k-j} h_j$$

The estimated transmitted signal elements $u_k$ are supplied to a decoder, such as a Viterbi decoder for providing decoded bits representing the message conveyed by the signal.

An all path prefilter 17 placed after the channel estimator 7 can ensure a minimum phase channel impulse response.

Figure 2:
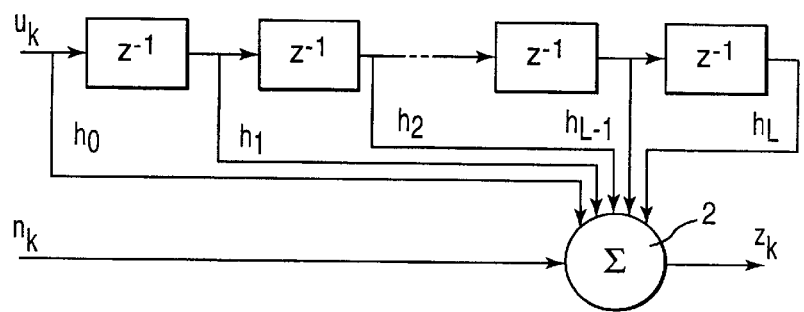
FIG. 2 is an equivalent discrete time model of a channel with assumed intersymbol interference ISI and additive white Gaussian noise (AWGN)

The theory underlying the present invention will now be discussed. A communication channel can be described as a finite state machine as represented in FIG. 2. In FIG. 2, blocks denoted $Z^{-1}$ represent successive path delays and the block denoted 2 represents a summing function. Using Forney's whitened matched filter as described in G. D. Forney, "Maximum likelihood sequence estimation of digital sequences in the presence of intersymbol interference", IEEE Transaction on Information Theory, Vol. IT-18, pp. 363–378, 1972, the channel can be represented by a discrete-time equivalent low-pass model, comprising intersymbol interference (ISI) and additive white (memoryless) stationary noise $n_k$ with probability density function (pdf) $p_n(n_k)$ Thus, a received signal sample $z_k$ at time k comprises a transmitted signal element $u_k$ and a noise element $n_k$. The channel impulse response h, assumed to be available before the symbol estimation, is denoted by a plurality of channel taps $h_0 \ldots h_L$ as in equation (1) where L denotes the channel length.

For the additive white Gaussian noise $n_k$ (AWGN), the probability density function (pdf) $p(n_k)$ is given by Equation (2) where $\sigma^2$ is the variance of the noise.

The complex-valued transmitted symbols $a_k$ are denoted by Equation (3) where M denotes the size of the signal set, i.e. the number of symbol components A which are summed to generate a transmitted symbol $a_k$.

The discrete-time channel model can be described by a trellis diagram with $Z=M^{L-1}$ states, where each state $S_k$ is defined by Equation (4).

The received signal at time k, $z_k$, is compared with each of a set of assumed signal elements $\Re(\xi_k)$ (the reference values) to form the so-called Euclidean distance $d(\xi_k)$ as defined in Equation (5) where $\xi_k$ are the transition branches from one of the valid predecessor states, $S_{k-1}$. Obviously, at each time, there are M transition branches from and to each state.

In the following described embodiment:

The trellis equaliser is implemented in hardware using a shift-register for holding the states $S_k$. Initial states of the shift-register are known beforehand.

Channel taps are available for the sequential estimation.

Derivation of Soft-Output Algorithm

According to Bayes theorem, the probability p that the received samples from time index 1 to k $z_1^k$ represent a transmitted signal element subject to a fixed decision delay D, $U_{k-D^1}$, is given by Equation (6).

The second probability in (6) which corresponds to the forward recursion can be calculated as in Equation (7) where Q is the set of M states of $S_k$, which lead to the state $S_{k+1}$. The second probability in Equation (7) can be replaced by an additive branch metric (ABM) $m_a$, where $m_a$ is given in Equation (8) in which $\gamma_1$ and $\gamma_2$ are artificial constants. By properly setting $\gamma_1$ and $\gamma_2$, convenient expressions for the ABM can be obtained. For example, if the symbol set is a uniform distribution, $P(S_{k+1}|S_k)$ remains constant for all branches where P is the a posteriori probability (APP). If we let $\gamma_2=2\sigma^2$ and the relation between $\gamma_1$ and $\gamma_2$ be as in Equation (9) then the ABM $m_a$ $(S_k, S_{k+1})$ is defined by Equation (10) where $\Re(\xi_k)$ is the noiseless output (reference) of branch $\xi_k$ and d is the Euclidean distance as defined earlier.

If the initial state $S_1$ is known, the expression in Equation (11) is true for any path $\zeta_k$ in the trellis diagram.

Define an additive accumulative path metric (APM) of path $\zeta_k$ aema $(\zeta_k)$ as the sum of the related ABM's, ie. as in Equation (12).

Therefore, the APM is a measure of the likelihood that the path has been used for transmisson, and the probability p $(\zeta_k, z_1^k)$ that the received samples between t=1 and k were transmitted via a path $(\zeta_k$ is given in Equation (13).

For any arbitrary decision delay $\delta$ ($L \leq \delta \geq D$), we can divide the paths at time k into m mutually exclusive subsets $\Lambda_k$ as given in Equation (14).

Obviously, the actually transmitted path belongs to one of the subsets. The soft output algorithm (SSA) is suboptimal because it only considers the path with the minimum APM for each subset. The APM's of the m selected paths are adopted as the soft-output decision for signal $U_{k-D}$. Therefore, we have the information packet illustrated in Equation (15).

The results are suboptimum in the sense that the selection of the information packet is a hard-quantization process and the symbol error probability is not minimised. However, when a sequence of information packet is hard-quantized, the sequence error is minimised. Therefore, at moderate-to-high SNR, the performance is quite acceptable.

Decision Feedback

The idea of decision feedback is that the trellis equaliser uses as much as possible the most prominent channel taps of the impulse response to form a reduced-states trellis structure for sequential symbol detection. The ISI caused by the rest of the taps of the impulse response are treated as an interference and deducted by the knowledge of the earlier estimated symbol information. For example, if we have the channel impulse response h with memory length L=L1+L2. It is divided into two parts as given by Equation (16).

Figure 3:
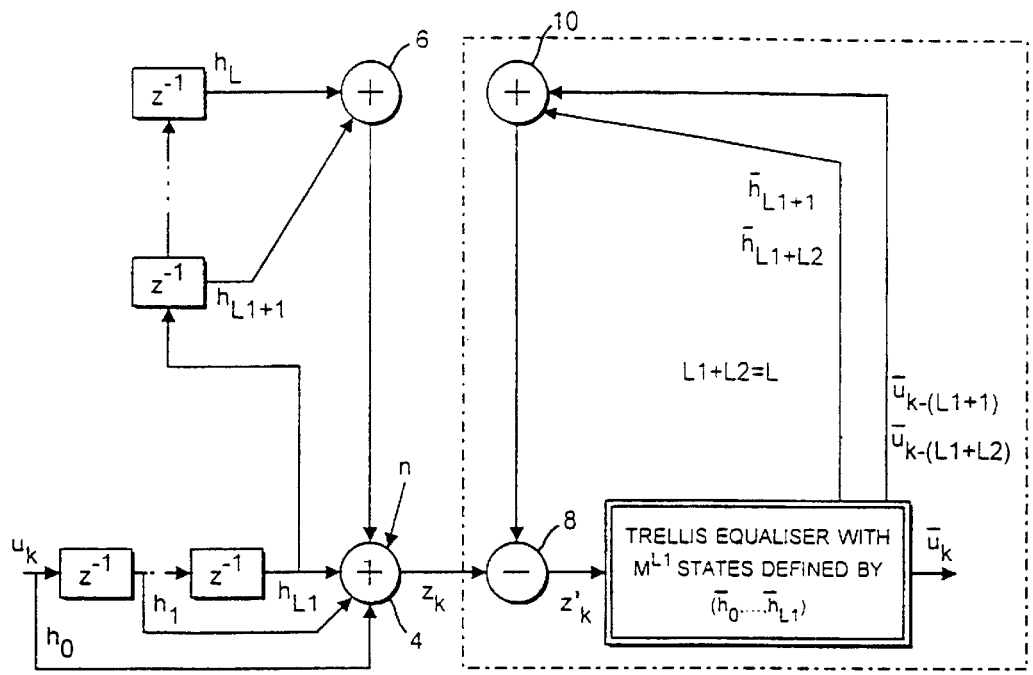
FIG. 3 is an equivalent model illustrating the principle of decision feedback with split channel taps.

The first part of the channel impulse response $(h_0, \ldots h_{L1})$ is organised for an estimator to provide estimated channel taps $h_0, \ldots h_{L1}$ for setting up the trellis states in the trellis structure while the second part $(h_{L1}, \ldots h_{L1+L2})$ is used for the decision feedback as shown in the diagram in FIG. 3. In FIG. 3, as in FIG. 2, the blocks denoted $Z^{-1}$ represent path delays for individual transmission paths. Reference numeral 4 denotes a summing function for summing together all the channel taps $h_L \ldots h_L$. Reference numeral 6 denotes a summing function for summing together only the channel taps $h_{L+1} \ldots h_L$ which are to be treated as interference. Reference numeral 8 denotes the subtraction function which removes as "interference" the part of the fed back sample corresponding to the channel taps $h_{L1+1} \ldots h_L$. Reference numeral 10 denotes the summing and correlating function which generates from the fed back signal samples and the estimated channel taps $h_{L1+1} \ldots h_{L1}$ the signal "interference" which is to be removed from the incoming signal samples $z_k$. At time k, the received signal $z_k$ is fed into the trellis sequential estimation having first removed the interference caused by the second part of the impulse response as indicated in Equation (17) where $(h_{L1+1}, \ldots h_{L1+L2})$ are the estimated taps of the second part of the channel response and $(u_{k-(L1+1)}, \ldots u_{k-(L1+L2)})$ is the soft-output decision of the trellis equaliser having states defined by the first part of the estimated channel impulse response $(h_0, \ldots h_{L1})$.

As the performance of such an equaliser is much determined by the shape of the channel impulse response, it is desirable to use a minimum phase filter before the equaliser.

On the other hand, the decision value associated with each symbol also affects the performance. According to the present system, a suitable soft-output decision has been developed which combines some kind of likelihood associated with each symbol that is actually transmitted. The likelihoods are combined together to form a soft output and are then used for the decision feedback.

In the information packet from the soft-output algorithm (SSA) (Equation 15) the likelihood for the values of each symbol are linearly combined together to give the soft output $u_k$ in Equation (18) where $P_{k,m}$ is the minimum accumulative metric (APM) results from SSA and $X_m$ is the combination coefficient.

To simplify the process, an Euclidean distance is defined between the assumed signal value $u_k$ (the reference) and the symbol $A_m$ actually transmitted as in Equation (19).

As an approximation, Equation (19) can be used for the APM output to derive the combination coefficient $X_m$.

This gives rise to Equation (20).

With a sequential transmission $u=\{A_1, A_2, A_3, \ldots A_M\}$, it is not difficult to derive the vector [X] from the matrix Equation (21).

For example, in a binary system (+1, −1), Equation (22) results.

Experimental Results

A COSSAP block (DFSSA1) for the Sub-optimum Soft-output Algorithm (SSA) with both soft and hard delayed decision feedback has been implemented. The program is coded in C and has been tested together with a COSSAP test bed. The channel delay profile used is Outdoor-to-Indoor B [7] having 3.7 µs of delay spread.

A COSSAP block is a computer aided engineering environment for designing, simulating and implementing digital signal processing and communication systems.

Outdoor-to-Indoor B [7] is a defined channel model for a mobile communicaiton system (designed by FRAMES).

Figure 4:
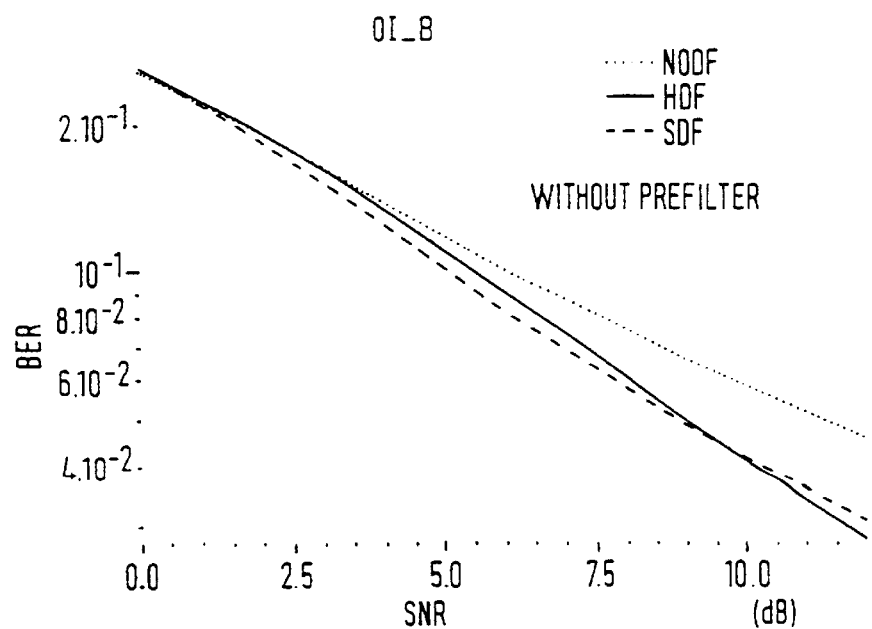
FIG. 4 is a graph showing simulation results comparing no decision feedback with hard decision feedback and soft decision feedback without a prefilter.

FIG. 4 shows the results from the simulations without the minimum-phase prefilter before the data entering the equaliser. The channel length is 6-symbol period with 7 taps, in which 4 taps ($L_1$=3) are used for the trellis definition and the rest of 3 taps ($L_2$=3) are truncated which are used/or not used for the decision feedback. We can see that the improvement with the decision feedback represented by HDF ( - - - ) and SDF ( - - - ) is evident compared with the one without decision feedback represented by NODF ( - - - - - - ). It is also to be noted that in the low SNR area (<10 dB), the result with soft decision feedback (SDF) gives about 0.1–0.3 dB gain over the one with hard decision feedback (HDF).

Figure 5:
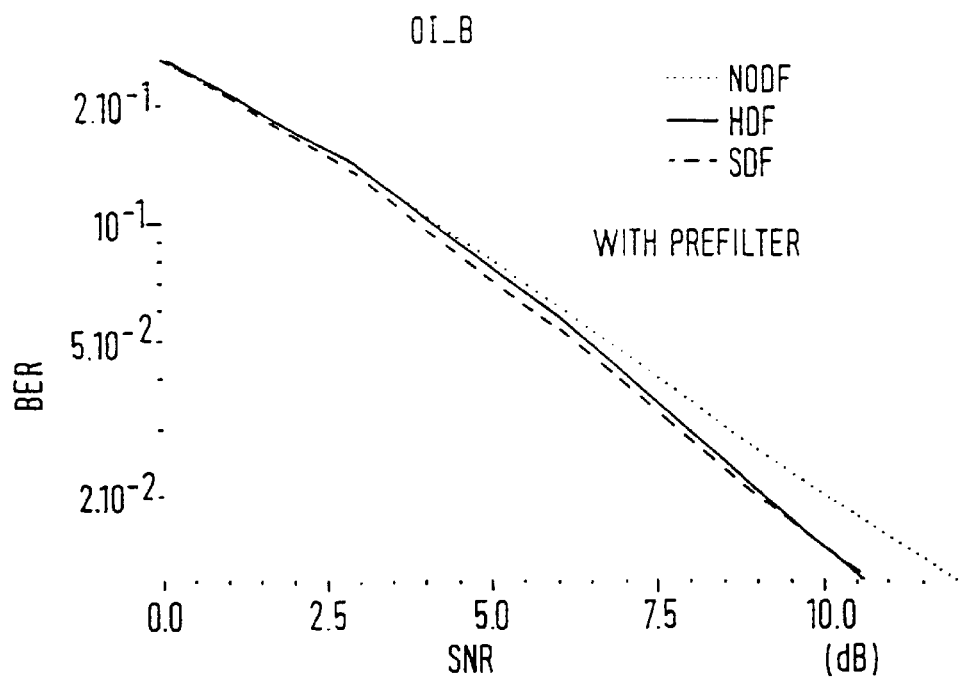
FIG. 5 is a graph showing simulation results as for FIG. 4 but with a prefilter.

FIG. 5 shows the results from the simulations with the minimum-phase prefilter before the data entering the equaliser. The channel shape is much improved by the filter and the effect of truncating the channel is less than those without the minimum-phase prefilter. Anyway, the decision feedback gives better result than by simply cutting the channel tail off.

Figure 6:
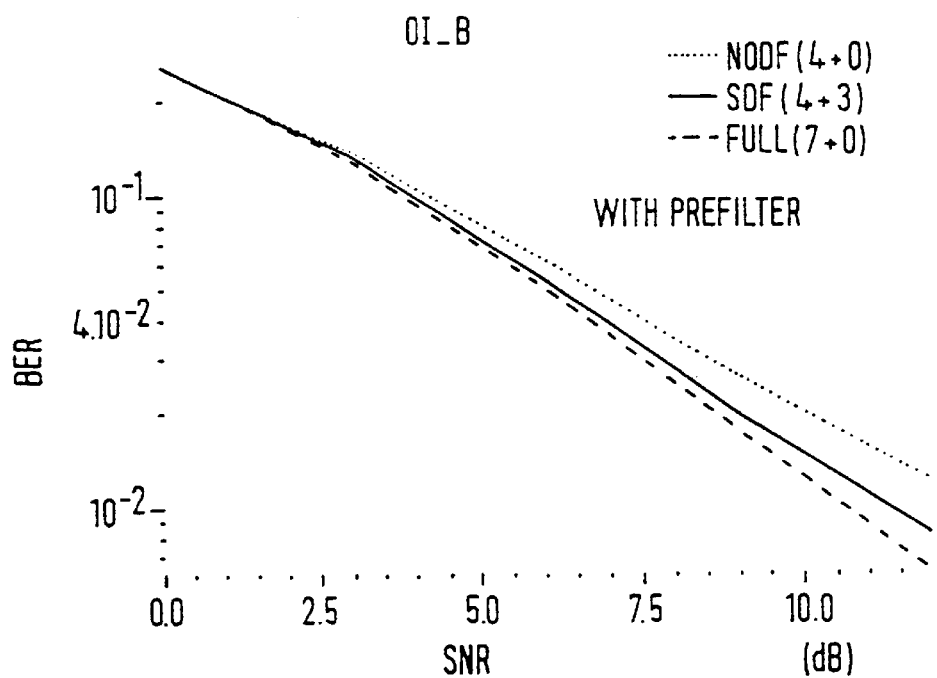
FIG. 6 is simulation results showing a comparison of feedback using full channel taps and split channel taps.

FIG. 6 shows the comparison between the results from a full states equaliser states (7 taps, number of states=$2^6$=64) and a reduced-states equaliser (4 taps, number of states=$2^3$= 8) with the decision feedback (3 taps). It seems that the decision feedback is a good trade-off between the computational load and the system performance.

Having described a particular working embodiment, let a general situation be considered. A transmitted symbol can be expressed by the vector A and its likelihood output by vector A' in the signal space. If an ellipse O is the noise region, the likelihood output can appear anywhere inside O due to the signal distortion by the noise+interference.

Define the uncertainty measure τ of the likelihood output:

$$\tau = \mu \bullet \|A - A'\|$$

where $\|A-A'\|$ is the distance between A and A', µ is a linear coefficient for the uncertainty. The meaning of the uncertainty is that if τ is small, the likelihood A' is close to the transmitted symbol A and the reliability is high. If τ is big, the noise level is high and subsequent processes should rely less on the signal. The value of τ should be controlled within 0–1. If the noise is very strong and the likelihood is run out of the ellipse O µ should be modified or τ should be truncated to 1. Otherwise, the signal would be reverted.

A soft output $S_A$ which contains the uncertainty measure for the transmitted symbol A is given in Equation (23).

$$S_A = A(1-\tau) = A(1-\mu \bullet \|A-A'\|) \quad (23)$$

For a 1 D signal, if the transmitted data set is given by Equation 24.

$$A \in \{a_1, a_2, a_3, \ldots, a_M\} \quad (24)$$

The soft output is given by Equation (25).

$$S_A = \sum_{i=1}^{M} a_i \cdot (1 - \tau_1) = \sum_{i=1}^{M} a_i (1 - \mu \cdot |a_i - a'_i|) \quad (25)$$

where $a_i'$ is the likelihood of $a_i$.

A by-product of this kind of soft decision method is that the uncertainty measure $\tau$ directly reflects the noise+interference level of the signal if let $\mu$ is 1. It can be used elsewhere in the receiver. The expectation of $\tau$ ($E\{\tau\}$) is the variance of noise+interference. For example, the power control loop can be based on $\tau$ or $E(\tau)$.

In the above embodiment, the trellis equalizer can be arranged to give two likelihoods for the transmitted binary signal (+1/−1) and they are in the form of the so-called accumulative survivor as in Equation (26).

$$ACC\_S_{=1} = E\{lk_{=1} + a_{path+1sum} + n_{=1}\}^2 \quad (26)$$
$$= lk_{=1}^2 + E\{a_{path+1sum} + n_{+1}\}^2$$
$$ACC\_S_{-1} = E\{lk_{-1} + a_{path-1sum} + n_{-1}\}^2$$
$$= lk_{-1}^2 + E\{a_{path-1sum} + n_{-1}\}^2$$

If the signal and the noise are zero mean, we can take the accumulative items ($E\{a_{path+1sum}+n_{+1}\}^2$ and $E\{a_{path-1sum}+n_{-1}\}^2$) away from the likelihoods. Also we need an approximation as in Equation (27).

$$\Omega = |ACC\_S_{+1} - ACC\_S_{-1}|^{1/2} \quad (27)$$
$$= |lk_{+1}^2 - lk_{-1}^2|^{1/2}$$
$$= |lk_{+1} - lk_{-1}|$$

The final soft output for the decision feedback is then given by Equation (28).

$$S_A = \text{sign}(ACC\_S_{-1} - ACC\_S_{+1}) \bullet \eta \bullet (1 - |1 - \Omega|) \quad (28)$$

$$h = \{h_0, h_1, h_2, \ldots, h_{L-1}, h_L\} \quad (1)$$

$$\rho(n_k) = \frac{1}{2\pi\sigma^2} \exp\left[-\frac{|n_k|^2}{2\sigma^2}\right] \quad (2)$$

$$a_k \in A \stackrel{d < t}{=} \{A_1, A_2, \ldots, A_M\} \quad (3)$$

$$S_k \stackrel{d < t}{=} (u_{k-L}, \ldots, u_{k-2}, u_{k-1}) \quad (4)$$

$$d(\xi_k) = |z_k - \mathcal{K}(\xi_k)| \quad (5)$$

$$p(u_{k-D}, z_1^k) = \sum_{\forall S_{k-1}} p(u_{k-D}, S_{k+1}, z_1^k) \quad (6)$$
$$= \sum_{\forall S_{k-1}} P(u_{k-D} | S_{k+1}, z_1^k) p(S_{k+1}, z_1^k)$$

-continued $$p(S_{k+1}, z_1^k) = \sum_{S_t \in Q} p(S_k, S_{k+1}, z_1^k) \quad (7)$$
$$= \sum_{S_t \in Q} p(S_k, z_1^{k-1}) p(S_{k+1}, z_l | S_k, z_1^{k-1})$$

$$m_a(S_k, S_{k+1}) \stackrel{d+t}{=} \gamma_1 - \gamma_2 \ln(p(S_{k+1}, z_k | S_k)) \quad (8)$$

$$\gamma_1 = \gamma_2 \ln\left(\frac{1}{2\pi\sigma^2} P(S_{k+1} | S_\lambda)\right) \quad (9)$$

$$m_a(S_k, S_{k+1}) = d^2(S_k, S_{k+1}) \quad (10)$$
$$= |z_k - \mathcal{R}(\xi_k)|^2$$

$$p(\zeta_k, z_1^k) = p(\zeta_k, z_1^k | S_1) \quad (11)$$
$$= p(S_2, z_1 | S_1) p(S_3, z_2 | S_2) \ldots p(S_{k+1}, z_k | S_k)$$

$$acm_a(\zeta_k) \stackrel{d+t}{=} \sum_{i=1}^{k} m_a(\xi_k) \quad (12)$$
$$= k\gamma_1 - \gamma_2 \ln(p(\zeta_k, z_1^k))$$

$$p(\zeta_k, z_1^k) \propto \exp\left(-\frac{m_a(\zeta_k)}{\gamma_2}\right) \quad (13)$$
$$= \exp\left(-\frac{m_a(\zeta_k)}{2\sigma^2}\right)$$

$$\Lambda_k(\delta, j) \stackrel{d+t}{=} \{\zeta_k | u_{k-\delta} = A_j\} \quad (j = 1, 2, \ldots, M) \quad (14)$$

$$\{\rho_{k-D,j}\} = \left\{\min_{\zeta_k \in \Lambda_t(D,j)} (m_a(\zeta_k))\right\} \quad (j = 1, 2, \ldots, M) \quad (15)$$

$$h = \{h_0, h_1, h_2, \ldots, h_{L1}, h_{L1+1}, \ldots, h_{L1+L2}\} \quad (16)$$

$$z_L = z_L - \sum_{j=L1+1}^{L_1+L_2} \overline{u}_{k-j} \overline{h}_j \quad (17)$$

$$\overline{u}_k = \sum_{m=1}^{M} \chi_m \rho_{k,m} \quad (18)$$

$$d_{k,m} = |u_k - A_m| \quad (19)$$

$$\overline{u}_k = \sum_{m=1}^{M} \chi_m d_{k,m} \quad (20)$$

$$\begin{pmatrix} \chi_1 \\ \chi_2 \\ \chi_3 \\ \vdots \\ \chi_M \end{pmatrix} = \quad (21)$$

$$\begin{pmatrix} 0 & |A_1 - A_2| & |A_1 - A_3| & \cdots & |A_1 - A_M| \\ |A_2 - A_1| & 0 & |A_2 - A_3| & \ddots & |A_2 - A_M| \\ |A_3 - A_1| & |A_3 - A_2| & 0 & \ddots & |A_3 - A_M| \\ \vdots & \ddots & \ddots & \ddots & \vdots \\ |A_M - A_1| & |A_M - A_2| & |A_M - A_3| & \cdots & 0 \end{pmatrix}^{-1} \begin{pmatrix} A_1 \\ A_2 \\ A_3 \\ \vdots \\ A_M \end{pmatrix}$$

$$\begin{pmatrix} \chi_1 \\ \chi_2 \end{pmatrix} = \begin{pmatrix} -0.5 \\ 0.5 \end{pmatrix} \quad (22)$$

What is claimed is:

1. A method of estimating symbols transmitted between a mobile station and a base station in a communication system comprising:

receiving via a communication channel a set of received signal samples which have travelled via different transmission paths, each signal sample conveying a symbol component;

estimating from the set of received signal samples a soft-output decision for the symbol which combines over a number of symbol components an estimated value for each symbol component with a likelihood parameter which indicates a level of reliability associated with that estimated value, wherein the likelihood parameter comprises a measure of the likelihood that a given path has been used for a transmission and a probability that the received samples were transmitted via the path; and using the soft-output decision as a feedback element to modify a subsequent set of received signal samples prior to estimating a soft output decision for the subsequent set of received samples.

2. A method according to claim 1, wherein a sequence of signal bursts are received via the communication channel and wherein a soft-output decision for each symbol in the signal burst is estimated and used as a feedback element prior to estimation of a subsequent symbol in the same signal burst.

3. A method according to claim 1, wherein the step of estimating a soft-output decision for the symbol is carried out in a trellis equalizer in which state transitions are effected via a set of transition branches.

4. A method according to claim 3, wherein the states for the trellis equalizer are initially defined by channel taps of a channel impulse response estimated from the received signal samples.

5. A method according to claim 4, wherein the channel impulse response comprises a number of channel taps, wherein a first set of the channel taps is utilized for setting the initial states in the trellis equalizer and a second set of the channel taps are treated as interference and used to modify the input signal prior to estimating a subsequent soft-output decision.

6. A method according to claim 4, wherein a minimum phase channel impulse response is generated using an all path prefilter.

7. A symbol estimation circuit for use in a mobile communication system for estimating symbols, the circuit comprising:

a receiver arranged to receive via a communication channel a set of signal samples which have travelled via different transmission paths, each signal sample conveying a symbol component;

an estimator for estimating from the set of received signal samples a soft-output decision for the symbol which combines over a number of symbol components an estimated value for each symbol component with a likelihood parameter which indicates a level of reliability associated with that estimated value wherein the likelihood parameter comprises a measure of the likelihood that a given path has been used for a transmission and a probability that the received samples were transmitted via the path; and a feedback path for feeding back the soft-output decision to modify a subsequent set of received signal samples prior to estimating a soft-output decision for the subsequent set of received samples.

8. A symbol estimation circuit according to claim 7, wherein the estimator takes the form of a trellis equalizer.

9. A symbol estimation circuit according to claim 7 in combination with a channel estimator which gererates a channel impulse response in the form of a set of channel taps, said channel taps being used to define states in a trellis equalizer.

10. A symbol estimation circuit according to claim 9, which comprises a memory for holding the channel taps in two parts, a first part being used to define said states in the trellis equalizer, and a second part being used to modify the fed back soft-output decision.

11. A symbol estimation circuit in combination with a channel estimator as claimed in claim 10, further comprising an all path filter for generating a minimum phase channel impulse response.

\* \* \* \* \*